United States Patent [19]
Lamb, Jr. et al.

[11] Patent Number: 5,477,310
[45] Date of Patent: Dec. 19, 1995

[54] FILM PACKAGE

[75] Inventors: Walter C. Lamb, Jr., North Billerica; Margaret A. Obermiller, Ipswich; Francis A. Ricci, Hyde Park, all of Mass.

[73] Assignee: Polaroid Corporation, Cambridge, Mass.

[21] Appl. No.: 239,614

[22] Filed: May 9, 1994

[51] Int. Cl.⁶ .................................................. B65D 81/20
[52] U.S. Cl. .............................. 355/72; 354/275; 206/455
[58] Field of Search ............................ 354/275; 355/72, 355/75; 206/455

[56] References Cited

U.S. PATENT DOCUMENTS

| | | | |
|---|---|---|---|
| H1201 | 6/1993 | Sakuma | 378/182 |
| 1,367,601 | 2/1921 | Hodgson . | |
| 1,685,813 | 10/1928 | Greve . | |
| 1,871,217 | 8/1932 | Klaus . | |
| 2,002,035 | 5/1935 | Liebeskind | 206/62 |
| 2,015,419 | 9/1935 | Ceely | 229/6 |
| 2,049,497 | 8/1936 | Gideon | 250/34 |
| 2,103,961 | 12/1937 | Wilmanns | 250/34 |
| 2,310,371 | 2/1943 | Lines et al. | 229/85 |
| 2,354,706 | 8/1944 | Rulon | 206/62 |
| 3,043,487 | 7/1962 | Fowle | 229/6 |
| 3,286,905 | 11/1966 | Farukhi | 229/9 |
| 3,433,636 | 3/1969 | Hamilton | 96/76 |
| 3,444,370 | 5/1969 | Boudin | 250/68 |
| 3,487,966 | 1/1970 | Kampf | 214/305 |
| 3,504,180 | 3/1970 | Tone | 250/68 |
| 3,527,343 | 9/1970 | Rutter | 206/62 |
| 3,645,388 | 2/1972 | Fessenden | 206/62 R |
| 3,721,364 | 3/1973 | Lukaschewitz et al. | 220/41 |
| 3,741,386 | 6/1973 | Schmidt | 206/62 R |
| 3,777,884 | 12/1973 | Hedin | 206/62 R |
| 3,795,080 | 3/1974 | Smolderen | 53/14 |
| 3,898,680 | 8/1975 | Asano | 354/174 |
| 3,954,173 | 5/1976 | Eaton | 206/205 |
| 3,968,926 | 7/1976 | Smolderen | 229/66 |
| 4,303,160 | 12/1981 | Weindanz | 206/455 |
| 4,324,473 | 4/1982 | Coughlan | 354/276 |
| 4,331,236 | 5/1982 | Bauer | 206/455 |
| 4,356,224 | 10/1982 | Akao et al. | 428/220 |
| 4,359,499 | 11/1982 | Akao et al. | 428/201 |
| 4,392,731 | 7/1983 | Van Heyningen | 354/180 |
| 4,408,340 | 10/1983 | Bauer | 378/187 |
| 4,493,545 | 1/1985 | Bauer et al. | 354/277 |
| 4,537,306 | 8/1985 | Muylle | 206/455 |
| 4,555,213 | 11/1985 | Tamura et al. | 414/412 |
| 4,565,733 | 1/1986 | Akao | 428/215 |
| 4,725,865 | 2/1988 | Hoffman, Jr. | 354/276 |
| 4,727,391 | 2/1988 | Tajima et al. | 354/277 |
| 4,778,713 | 10/1988 | Akao | 428/215 |
| 4,780,357 | 10/1988 | Akao | 428/216 |
| 4,784,906 | 11/1988 | Akao | 428/324 |
| 4,802,618 | 2/1989 | Seto et al. | 229/68 |
| 4,807,271 | 2/1989 | Covington et al. | 378/182 |
| 4,869,368 | 9/1989 | Hara | 206/455 |
| 4,915,229 | 4/1990 | Yamada et al. | 206/455 |
| 4,955,479 | 9/1990 | Beer et al. | 206/455 |
| 4,984,688 | 1/1991 | Mikulin | 206/455 |
| 5,026,600 | 6/1991 | Akao | 428/328 |
| 5,064,070 | 11/1991 | Higashiyama | 206/455 |

(List continued on next page.)

Primary Examiner—Michael L. Gellner
Assistant Examiner—D. P. Malley
Attorney, Agent, or Firm—Leslie Payne

[57] ABSTRACT

A film package including sheets of imaging media or film sandwiched between upper and lower stiffeners and enclosed by an envelope. Adhesive strips secure the stiffeners together at overlapping tabs formed on opposite sides of the stiffeners. The stiffeners with the film sheets are removed from the envelope by opening one side of the envelope. The adhesive strips also have tear strips for allowing removal of the upper stiffener after the package has been placed in a drawer of a printer with the aid of offset tabs on the stiffeners which indicate and assure proper orientation. A notch in the corner of the lower stiffener allows a signal to be passed to indicate whether the upper stiffener has been removed. The lower stiffener is also apertured to receive a signal for indicating whether any film sheets remain on the stiffener while in the drawer of the printer.

7 Claims, 5 Drawing Sheets

U.S. PATENT DOCUMENTS

| | | | |
|---|---|---|---|
| 5,083,665 | 1/1992 | Schoenberg et al. | 206/455 |
| 5,084,728 | 1/1992 | Horikiri et al. | 355/72 |
| 5,123,040 | 6/1992 | Fabian | 378/182 |
| 5,123,536 | 6/1992 | DiPietro | 206/455 |
| 5,166,967 | 11/1992 | Fabian | 378/168 |
| 5,228,678 | 7/1993 | Matsuda et al. | 271/145 |
| 5,330,053 | 7/1993 | Tabuchi et al. | 206/455 |

FILM PACKAGE

BACKGROUND AND OBJECTS OF THE PRESENT INVENTION

The present invention resides in the art of film packages where it is known to house a stack of sheets of imaging media or film between stiffener members that are connected together and enclosed in an outer package such as an envelope.

A wide variety of packaging arrangements have been proposed in the prior art for protecting, storing, shipping, and dispensing thin film materials. In the film imaging art, it is desirable to provide protection for a stack of film units which must be shipped and stored without becoming damaged. Exemplary of known prior art packages of the foregoing type are described in the following U.S. Pat. Nos.: 4,869,368; 4,915,229; 5,064,070; and Statutory Invention Reg. H1201.

Despite the variety of known packages of the above type, there exists a need for one which is easy to open and install in a proper orientation in a machine therefor, whereby the film can be easily and reliably fed to a printing station. There is also a need for a package of the above type which protects the film sheets from damage during package handling and against relative movement prior to use, and one which indicates whether the package has been properly disassembled and whether all the film sheets have been used. It is also desired to have a novel package that will indicate during use whether the package has been properly disassembled and whether all the film sheets have been used. It is also desired to provide a film package that will achieve the above objects and yet may be commercially produced at relatively low cost without sacrificing protection of the film sheets.

SUMMARY OF THE INVENTION

In accordance with the present invention, there is provided an improved film package which overcomes the disadvantages of prior art packages.

Included in this invention is a film package including in combination: at least one sheet of film, upper and lower stiffeners sandwiching the film and having tabs projecting therefrom. The tabs include tabs on opposite sides of the stiffeners and offset from each other to indicate the proper orientation of the lower stiffener for insertion into a drawer of a printing mechanism or the like. Included is means at the tabs attaching the stiffeners to each other. This means being disruptable to remove the upper stiffener. The lower stiffener having tabs that are foldable away from the film to allow the film to be fed from the lower stiffener and facilitate removal of the film sheet from the drawer. The present invention also includes a method of processing a film package of the type described above.

The present invention in its preferred form includes a stack of film sheets sandwiched between stiffeners secured together by adhesive strips. The strips are located at overlapping tabs on the stiffeners and are severed to remove the top stiffener. The package of stiffeners and film sheets is inserted in a tray or drawer in a printer for example. Offset tabs on the stiffeners indicate proper orientation of the stiffeners and film for receipt in the tray. The adhesive strips are then removed or severed and the upper stiffener is removed from the tray. A signal is passed through a recessed area in the lower stiffener at its periphery to determine whether the upper stiffener has been removed. During use, another signal is passed through an aperture in the lower stiffener to indicate whether any film sheets remain on the stiffener while in the tray of the printer.

An object of the present invention is to provide novel improvements in film packages of the type identified above. Another object is to provide a novel method of utilizing a film package in a machine such as a printer.

A further object is to provide a novel film package that is easy to open and install in proper orientation in an imaging machine or printer. Included herein is such a package that safely contains the film sealed against the atmosphere until the point of use. In addition, the package protects the film sheets against relative movement prior to use.

A further object of the present is to provide a novel package that will indicate during use whether the package has been properly disassembled and whether all the sheets have been used.

A further object of this invention is to provide an adhesive strip with a tear portion to facilitate separation of an upper stiffener from a lower stiffener.

A still further object of the present invention is to provide a film package that will achieve the above objects and yet may be commercially produced at relatively low cost without sacrificing protection of the film sheets.

BRIEF DESCRIPTION OF THE DRAWINGS

Other objects and advantages of the present invention will become apparent from the following more detailed description taken in conjunction with the attached drawings in which.

DETAILED DESCRIPTION

Figure 1:
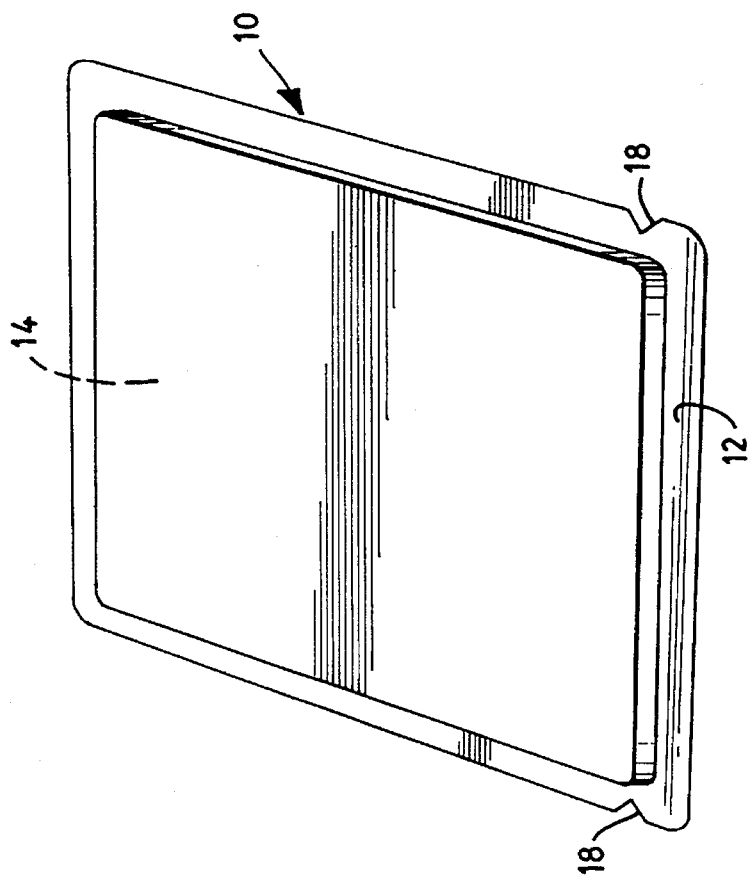
FIG. 1 is a perspective view of an outer package or envelope included in one form of the present invention.
Figure 4:
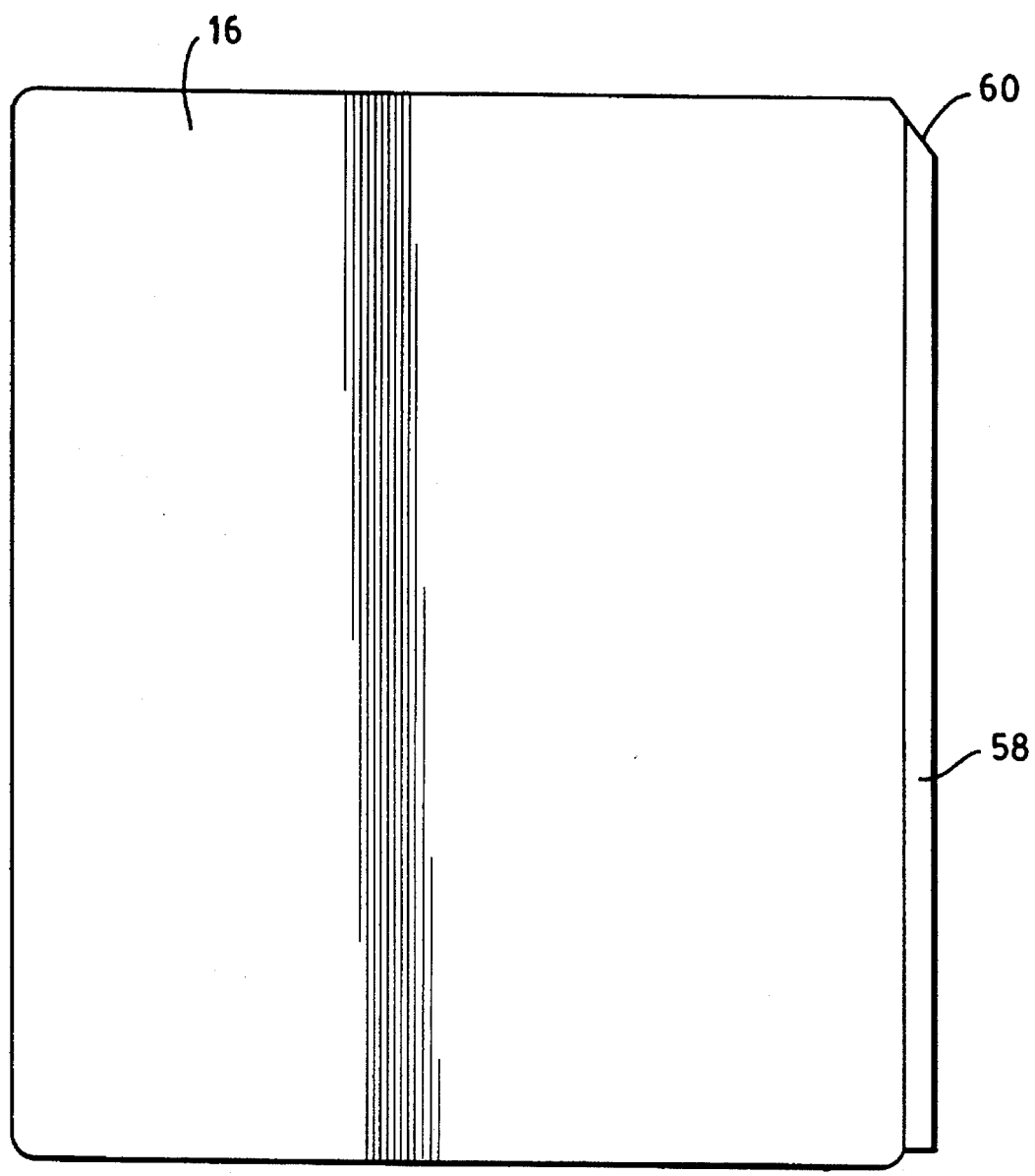
FIG. 4 is a front view of a film unit included in the preferred embodiment of the present invention.

Referring now to the drawings in detail, there is shown for illustrative purposes only in FIG. 1, a package for imaging media or film including an outer package or envelope generally designated 10. It comprises a commercially available shallow envelope or bag made of a suitable combination of a commercial flexible laminate material that is, preferably notch sensitive and has a linear structure to allow easy opening. One type of laminate can comprise a sandwich of linear low density polyethylene, aluminum foil, and polyester layers. Preferably, the package 10 is vapor resistant, scuff resistant, and vacuum wrappable about an inner package generally designated 14. The inner package 14 is to be stored in the outer package 10 under seal and vacuum wrapped until the point of use. The outer package 10 is also moisture resistant and as shown in FIG. 1 is dimensioned slightly greater than the inner package 14 to assist in the insertion of the inner package. The vacuum wrapped outer package compresses the inner package and all the media therein to prevent relative motion of the film sheet surfaces and thus prevent scratches and abrasion on the film sheets while enhancing the overall rigidity and unity of the entire package assembly. Since in the specific embodiment shown, the inner package 14 and film sheet 16 (see FIG. 4) have a generally rectangular shape, the outer envelope or package 10 is similarly shaped. Along the length of the outer package 10 on one side thereof is provided an elongated tab 12 having notches 18 that may easily facilitate linear tearing therealong to open the outer package 10 for removal of the inner package 14. Since the outer package 10 is commercially available, no further detailed description of it is believed to be necessary.

Figure 2:
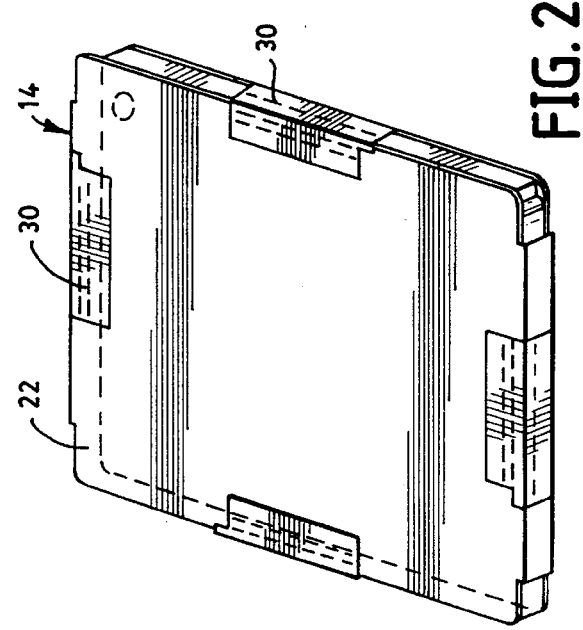
FIG. 2 is a perspective view of an inner package included in a preferred form of the invention.
Figure 3:
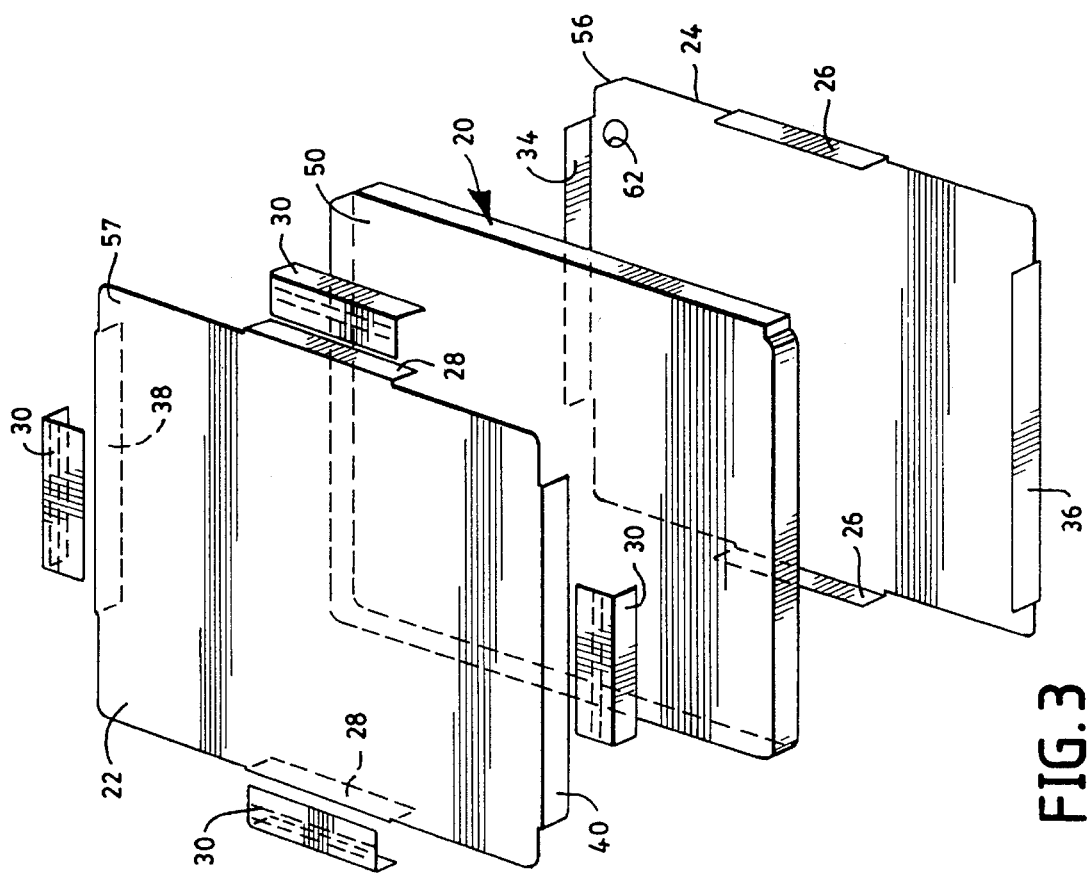
FIG. 3 is an exploded, perspective view of the inner package of FIG. 2.

Referring now to FIGS. 2 and 3, the inner package includes a stack of imaging media or film sheets 16 generally designated 20 sandwiched between upper and lower stiffeners 22 and 24. Although the film is shown diagrammatically in FIGS. 2 and 3 as one element 20, it will be understood that a plurality of sheets will be used in the preferred embodiment. Stiffeners 22 and 24 are made from flexible, but semirigid sheet material such as, for example, 24 pt. SBS, solid bleached sulfate, paperboard coated with polyethylene. Other materials, preferably coated, can be used so long as they minimize the presence of any paper dust in the printer in which it will be used. As shown, stiffeners 22 and 24 have flat planar surfaces conforming to those of the film stack 20.

As shown in FIGS. 2 and 3, the stiffeners 22 and 24 are provided with flaps or tabs for reinforcing the stiffeners as well as securing the stiffeners together with the film stack 20 therebetween whereby the latter is secured against unintended displacement. The film stack may comprise about 125 sheets of dry laser imaging type film. In the preferred embodiment, lower stiffener 24 has opposed tabs 26 projecting normal from the plane of the stiffener 24 at locations intermediate the opposite sides of stiffener 24. In the specific forms shown, the tabs 26 are centered along the sides of lower stiffener 24 and terminate short of the opposite ends of upper stiffener 22. Upper stiffener 22 has tabs 28 centered at central portions on opposite sides thereof corresponding to tabs 26 of the lower stiffener. During assembly of the inner package 14, once the film stack 20 is placed on the lower stiffener 24, the upper stiffener 22 is placed over the film stack 20 with tabs 26 and 28 overlapping each other and tabs 26 positioned outwardly of tabs 28.

The upper and lower stiffeners 22, 24 are secured to each other preferably by adhesive strips 30 having a portion adhered to tab 26 on the lower stiffener and a second portion extending at right angles and adhered to the top surface of the upper stiffener 22, as best shown in FIG. 2. In addition, it is preferred that adhesive strips 30 be provided with tear or zipper portions 32 (FIG. 5) for allowing easy severance or disruption of the adhesive strips 30 for disassembling the package as will be described.

Figure 5:
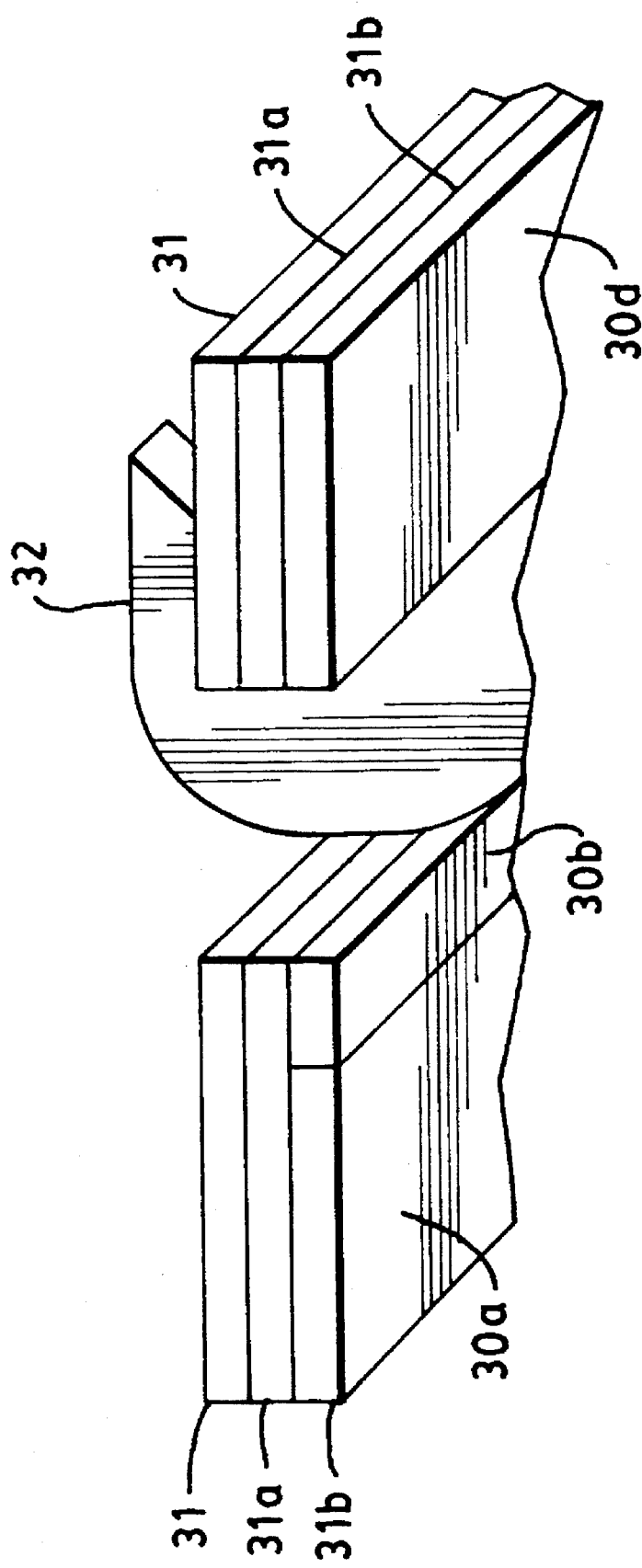
FIG. 5 is a partial perspective view of a self-adhesive label that is used with the inner package with a zipper portion thereof being partially peeled back.

Reference is made to FIG. 2, 3 and 5 of this embodiment, for illustrating the integral self-adhesive strip 30. As best shown in FIG. 5, the strip 30 is comprised of elongate foldable panels 30a,b,d and the zipper portion 32. Intermediate the panels 30b and 30d is the zipper panel 32, which will be described later, will be peeled so as to separate the strip 30. The strip 30 is, preferably, a commercially available laminate possessing a polyolefin layer 31 having notch sensitivity and being highly linear in terms of tearability. The linear polyolefin layer 31 has a pressure sensitive adhesive layer 31a thereon which is treated with a release layer that interfaces with a paper carrier web 31b. The material of the foregoing type of adhesive strip 30 is commercially available and no further detailed description of it is believed to be necessary. The adhesive strip 30 is notched linearly, to form the noted zipper 32 and the foldable panels 30a, d. Also, the adhesive strip 30 is back side slit through the web 31b only. The adhesive strip 30 is applied after the paper web for the panels 30a and 30d have been removed and the adhesive backed portions are attached to respectively the tabs of the lower stiffener and the upper stiffener. Once it is desired to separate the upper stiffener, the tear or zipper portion 32 is removed by peeling, thus leaving the web portion 30b with paper and this prevents inadvertant sticking of the film to the tabs.

In addition to the tabs 26 and 28 on the opposite sides of the upper and lower stiffeners, overlapping tabs on the forward and rearward ends of the upper and lower stiffeners are also utilized as shown. Lower stiffener 24 has on its forward end a tab 34 at a location opposed but offset from a tab 36 on its rear end as best shown in FIG. 3. Upper stiffener 22 has tabs 38 and 40 corresponding to tabs 34 and 36 of the lower stiffener. Adhesive strips 30, similar to those described above, are utilized for securing the tabs 34, 38, and 36, 40 at the front and rear ends of the stiffeners, it being understood that tabs 34 and 36 will lie outside of tabs 38 and 40 when the upper and lower stiffeners are secured by the adhesive strips 30. In addition and as described above, tear portions 32 are provided for easily tearing the adhesive strips 30 for disconnecting the tabs at the front and rear ends of the stiffeners.

The height of the tabs is chosen to provide a compact package with the film stack 20 securely held against movement between the stiffeners as shown in FIG. 2. Any suitable material may be employed in manufacturing the stiffeners as long as it provides the desired flexible but self-supporting characteristic. Also the material must permit the tab 36 on the forward end of the lower stiffener to be folded down into the plane of the lower stiffener 24 after the package is loaded into a printer or other mechanism as will be described below.

After the stack of film 16 (FIG. 5) is packaged within the upper and lower stiffeners 22 and 24 and secured to each other by means of the tabs and adhesive strips, the inner package is sealed and vacuum wrapped by and within the outer package 10. In this condition, the film may be safely handled, stored, and preserved until the point of use at which time the tab 12 of the outer package is torn and the inner package is removed. The inner package 14 is then placed into a tray or drawer generally designated 50 in FIGS. 6 and 7 of an associated printing machine or similar mechanism for use of the film stack 20. The fact that the tabs 34 and 38 on the forward end of the stiffeners are offset or asymmetrical to one side relative to the tabs 36 and 40 at the rear end indicates to the user that the package must be oriented with the offset tabs 34, 38 at the forward end through which the film stack will be fed in use. In event, the user does not notice the offset, then the drawer, as shown in FIG. 7, is configured such that the pairs of tabs 36, 40, and 34, 38 cooperate with recessed receiving walls 51a in the drawer 50, so as to prevent misloading. If desired, suitable indicia may also be provided on the upper stiffener or adhesive strips 30 which may be in the form of labels. Once the inner package 14 is properly installed in the drawer 50, the tear portions 32 of each of the adhesive strips 30 on each of the tabs is removed by hand and then the upper stiffener 22 is removed from the drawer 50.

In order to indicate to the user whether the upper stiffener 22 has been removed from the drawer 50, a signal such as a beam A from a monitor is passed upwardly through a passage 52 (FIG. 6) in the bottom wall or base 54 of the tray and beyond lower stiffener 24. To accomplish this in the preferred embodiment, one corner of the lower stiffener 24 is recessed by a chamfer or bevel portion 56 (FIG. 3) to allow the signal to pass beyond the lower stiffener 24 in the space between the bevel 56 and the surrounding portions of the drawer 50. If the upper stiffener 22 has inadvertently been left in the drawer 50, the signal striking the upper stiffener 22 at 57 will indicate to the user this condition. In this regard, all the film sheets 16 have a peel tab 58 (FIG. 4) extending along the length and each tab is provided with a notch or recess 60 that corresponds in position and size to the peripheral bevel 56 on the lower stiffener 24 so as to facilitate the sensing of the upper stiffener 22 as well as the film sheets 16.

Figure 6:
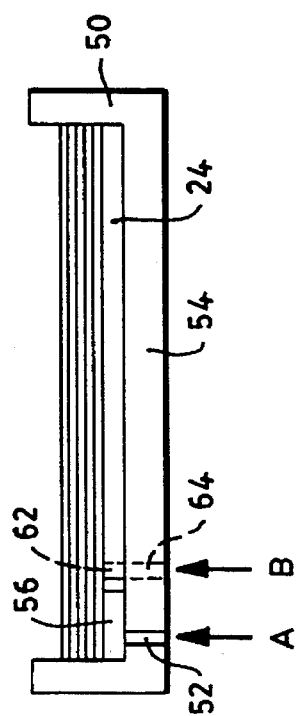
FIG. 6 is a cross-sectional view illustrating how the inner package is used; and, FIG. 7 is a perspective of the inner package within a tray of a printing mechanism.
Figure 7:
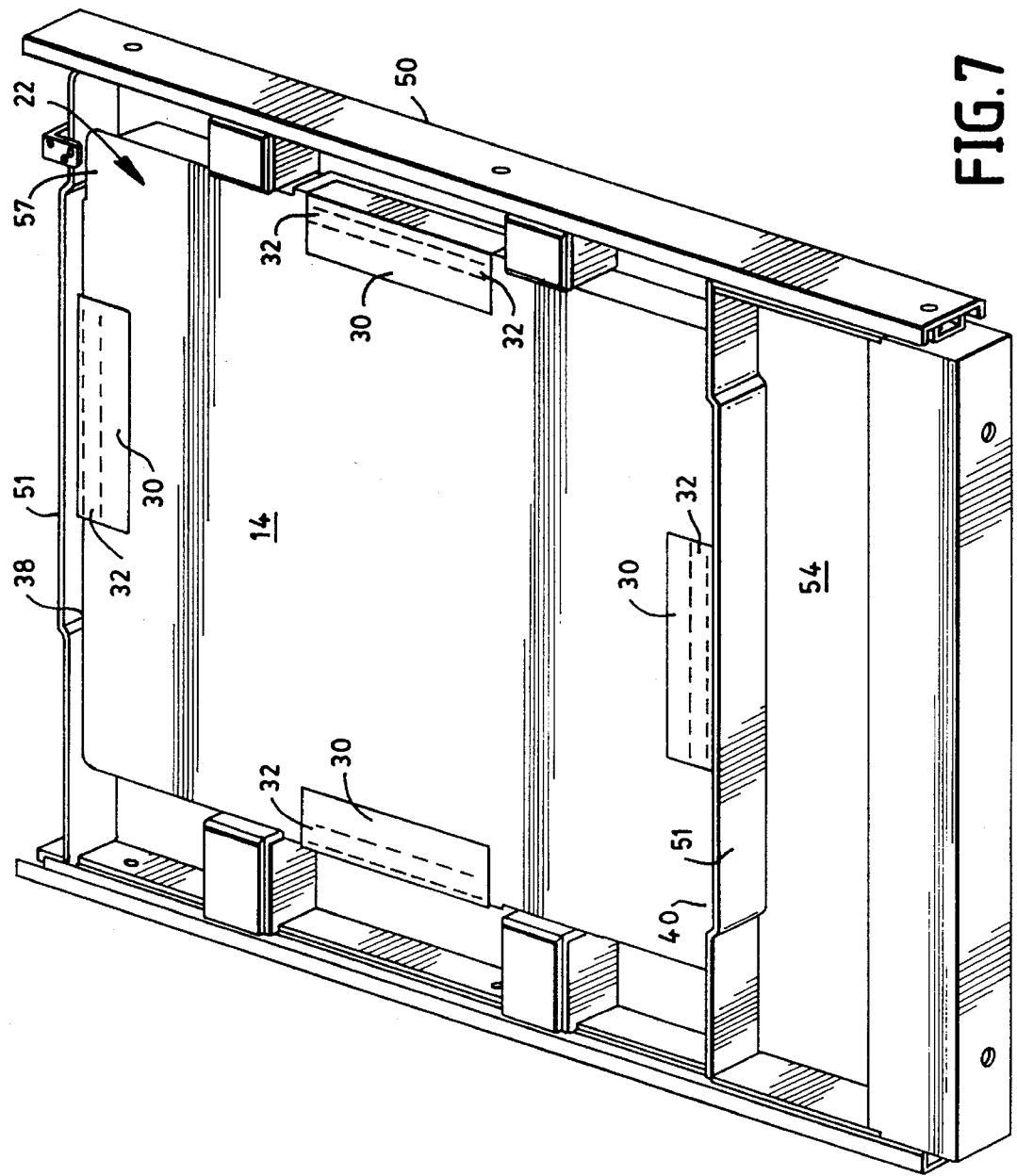

In addition, the lower stiffener 24 is provided with an aperture 62 to register over an aperture 64 provided in the base 54 of the tray as shown in FIG. 6. The purpose is to allow a signal, such as a beam B to pass through the stiffener 24 to determine whether any film remain in the tray or whether the supply in the tray has been exhausted. Once the lower stiffener 24 has been properly inserted in the tray 50 and the upper stiffener 22 has been removed, the tabs at the forward end of the lower stiffener moves away from the edge of the film stack to permit the film to be fed from the lower stiffener. Without interfering with removal of such sheet. Once the supply of film has been exhausted as indicated by the signal B, the lower stiffener 24 is removed from the tray and replaced with a new supply of film.

It will therefore be seen that the present invention provides a film package that will safely preserve the film and yet will allow it to be accessed and installed in a printing machine or other mechanism for use without scratching or otherwise impairing the condition of the film. In addition, the film package secures the film from unintended movement as well as promotes easy handling and storage. Furthermore, the present invention provides a package that may be manufactured at relatively low cost and easily disassembled and opened, while also allowing the film to be loaded in an associated machine without damaging the film in any way.

Although a preferred embodiment of the present invention has been shown and described above, it will be understood that the invention is not limited to such embodiment but rather the scope of the invention is indicated in the appended claims.

What is claimed is:

1. A film package including in combination: at least one sheet of film, upper and lower stiffeners sandwiching the film and having tabs projecting therefrom, said tabs including tabs on opposite sides of the stiffeners and offset from each other to indicate the proper orientation of the lower stiffener for insertion into a drawer of a printing mechanism or the like, and means at the tabs attaching the stiffeners to each other so that the stiffeners protect against relative movement of the sheet prior to use, said means including a tearable adhesive strip being disruptable to facilitate removal of the upper stiffener, said lower stiffener having tabs that are foldable away from the film to allow the film to be fed from beyond the lower stiffener; the lower stiffener has a recess in a peripheral portion thereof for admitting a signal directed towards the upper stiffener, the upper stiffener has a surface area generally aligned above the recess to receive a signal passed through the recess to indicate that the upper stiffener has not been removed from the film package when the package is placed into a printer or the like for use, wherein said lower stiffener has an aperture for passing a signal to a sheet of film to indicate the presence or absence of a sheet of film during use in a printer or the like, and wherein said adhesive strip is attached to the tabs and has tear portions for disrupting the strip to allow removal of the upper stiffener from the lower stiffener after inserting the inner package into a tray of a printer or the like.

2. The film package defined in claim 1 wherein the stiffeners have a generally rectangular shape and said recess is located at a corner of the lower stiffener.

3. The package defined in claim 1 wherein said tabs terminate short of opposite ends of the stiffeners.

4. The package defined in claim 1 further including a flexible envelope enclosing and sealing the upper and lower stiffeners, said envelope defining a space snugly receiving said stiffeners and film, and said envelope further being made so as to facilitate easy opening of the envelope to remove the package of stiffeners and film.

5. The film package defined in claim 4 further being vacuum wrapped relative to the package of stiffeners and film so as to prevent relative displacement of the film to the upper and lower stiffeners and to adjacent sheets thereby preventing abrasion, scratching and mechanical damage to individual film sheets.

6. The film package defined in claim 1 wherein each of said adhesive strips includes an integral member having at least a pair of separated folded panel portions, each one being adhesively attached to a respective upper stiffener and lower stiffener tab and the tear portion being formed on the strip and bridging the panel portions, the tear portion not being adhesively attached to either one of the upper stiffener and the lower stiffener tab so that upon the tear portion being removed such results in separation of the panel portions and thereby allows separation of the upper and lower stiffeners.

7. A film package assembly including in combination: upper and lower stiffeners of sheet material for sandwiching a film therebetween to protect the film, said stiffeners having overlapping tabs projecting from opposite portions thereof and adhesive strips at the tabs securing the stiffeners to each other, said adhesive strips having tear portions to disrupt the strips to permit the upper stiffener to be removed from the lower stiffener prior to insertion of the lower stiffener with the film into a drawer of a printing machine or the like, said lower stiffener having on a forward end thereof a tab which is foldable towards the plane of the lower stiffener to permit film located on the lower stiffener to be fed beyond the lower stiffener during use and means on the stiffeners for indicating the forward end thereof to enable proper orientation of the film in a printer or the like; the stiffeners have a generally rectangular shape, the lower stiffener has a recess at one corner thereof to receive a signal passed through the recess to indicate whether the upper stiffener has not been removed from the film when the package is placed into a printer or the like for use, and wherein said lower stiffener has an aperture for passing a sisal to a sheet of film on the lower stiffener to indicate the presence or absence of a sheet of film during use in a printer or the like.

* * * * *